United States Patent [19]

Graber

[11] 4,039,106

[45] Aug. 2, 1977

[54] AUTOMOBILE BICYCLE CARRIER

[75] Inventor: Thomas L. Graber, Madison, Wis.

[73] Assignee: Joseph V. Graber, Middleton, Wis.

[21] Appl. No.: 694,530

[22] Filed: June 10, 1976

Related U.S. Application Data

[63] Continuation-in-part of Ser. No. 569,211, April 18, 1975, abandoned.

[51] Int. Cl.² ............................................. B60P 3/06
[52] U.S. Cl. ........................... 224/29 R; 224/42.03 B; 211/17; 211/20
[58] Field of Search .......... 224/29 R, 42.1 R, 42.1 F, 224/42.1 E, 42.03 B, 42.03 R; 214/450; 211/17, 18, 19, 20, 21, 22; 105/367

[56] References Cited

U.S. PATENT DOCUMENTS

| 2,803,349 | 8/1957 | Talbot | 224/42.03 B UX |
| 3,204,839 | 9/1965 | Yuda et al. | 224/42.03 B UX |
| 3,687,318 | 8/1972 | Casey et al. | 214/450 |
| 3,901,421 | 8/1975 | Kalicki et al. | 224/42.03 B X |

Primary Examiner—Robert J. Spar
Assistant Examiner—Jerold M. Forsberg
Attorney, Agent, or Firm—Morsbach & Pillote

[57] ABSTRACT

An automobile bicycle carrier including a pair of upwardly opening channels for receiving the wheels of a bicycle and mounted in relatively parallel relation on a pair of cross-frame members and having a pair of bicycle support members mounted at their lower ends on respective ones of the cross-frame members and extending upwardly and relatively crossing relationship and having lateral arms at the upper ends for engaging a portion of the frame of a bicycle resting in a respective one of the channels to support the latter. The carrier including the channels, cross-frame members and bicycle support members can be disassembled to enable compact packaging for shipment or storage.

6 Claims, 13 Drawing Figures

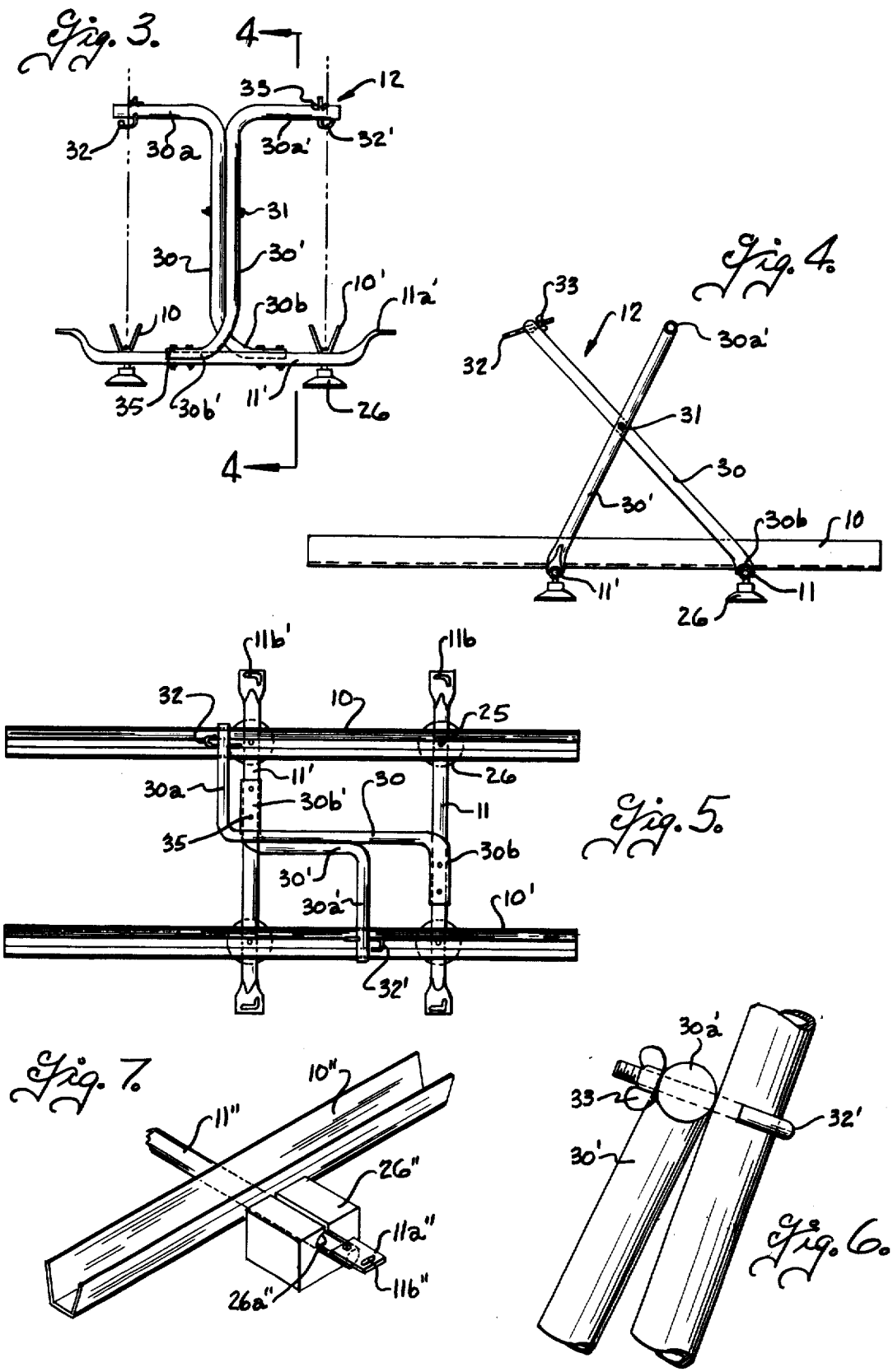

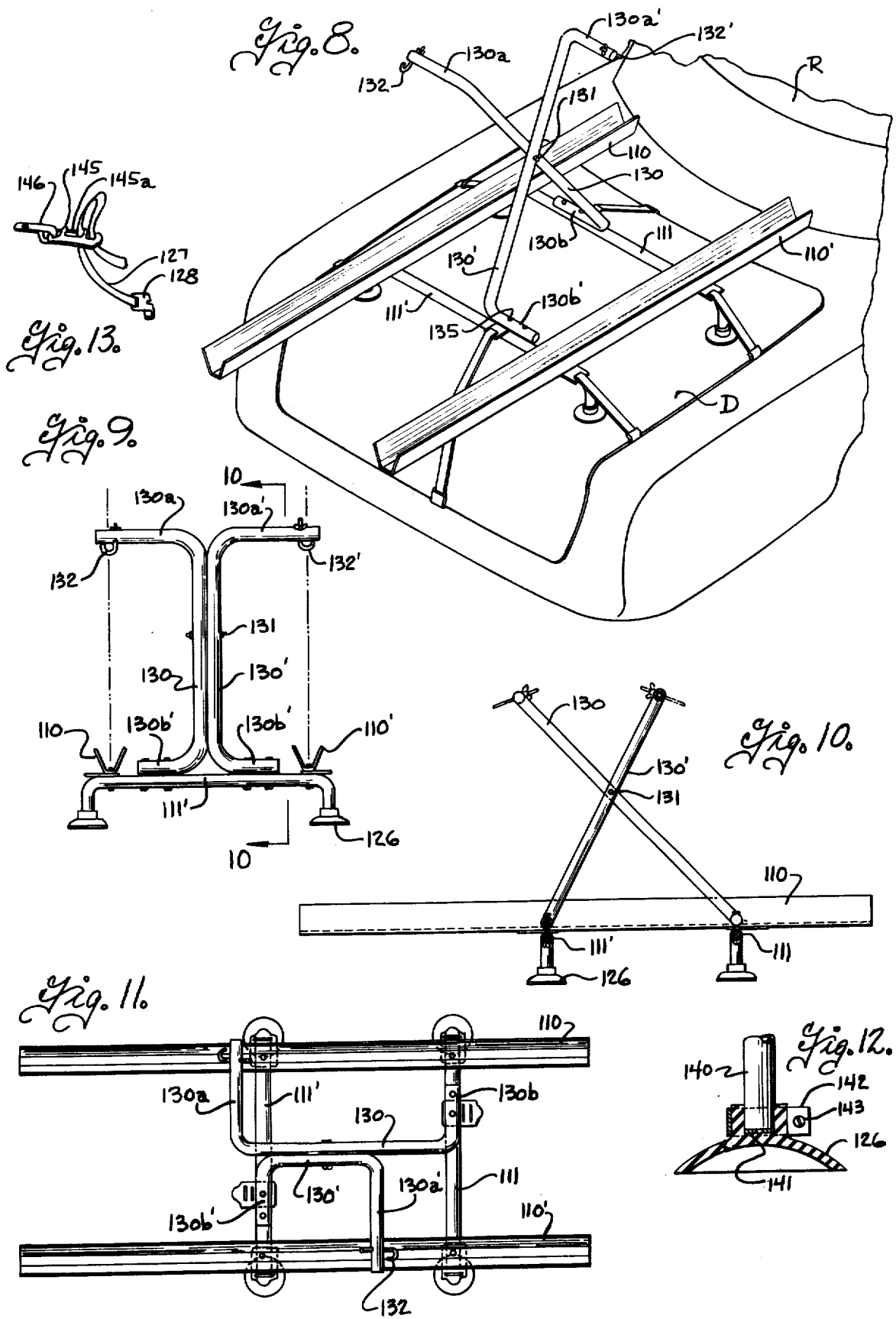

ent application for "Automobile Bicycle Carrier", Ser. No. 569,211, filed Apr. 18, 1975, now abandoned.

AUTOMOBILE BICYCLE CARRIER

REFERENCE TO RELATED APPLICATION

This application is a continuation-in-part of my copending application for "Automobile Bicycle Carrier", Ser. No. 569,211, filed Apr. 18, 1975, now abandoned.

BACKGROUND OF THE INVENTION

Automobile bicycle racks have heretofore been made utilizing a pair of upwardly opening channels mounted in relatively parallel relation on a pair of cross-frame members and with a bicycle support in the form of a rigid U-shaped frame attached to the cross-frame members intermediate the channels and having laterally extending arms for engaging and supporting a bicycle resting in a respective one of the channels as shown in U.S. Pat. No. 3,901,421. The U-shaped frame, even when disassembled from the cross-frame members, was large and required a large size package which was bulky and which could not be shipped by some carriers having limitations on the combined length and girth of the packages which they would handle.

SUMMARY OF THE INVENTION

It is the general object of this invention to overcome the above problems by providing an automobile bicycle carrier which can be disassembled and packaged in a compact package.

Another object of this invention is to provide an automible bicycle carrier for supporting a pair of bicycles which is light in weight and which provides improved stability in supporting the bicycles.

These objects and advantages are achieved by a bicycle carrier including a pair of upwardly opening channels for receiving the wheels of a bicycle mounted in relatively parallel relation on a pair of cross-frame members and having a pair of bicycle support members mounted at their lower ends on respective ones of the cross-frame members and extending upwardly in relatively crossing relation and having lateral arms at their upper ends for engaging a portion of the frame of a bicycle in a respective one of the channels to support the latter. The channels are detachably connected to the cross-frame members and the bicycle support members are detachably connected to the channels and detachably connected at their cross-over point to enable disassembly for compact packaging. The interconnected relatively crossing bicycle support members stabilize and reinforce each other to provide a stable support for the bicycles engaged thereby.

These, together with other objects and advantages of this invention will be more readily understood by reference to the following detailed description when taken in connection with the accompanying drawings wherein:

FIG. 3 is an end elevational view of the bicycle carrier;

FIG. 4 is a longitudinal sectional view showing the bicycle taken on the plane 4—4 of FIG. 3;

FIG. 5 is a top plan view of the automobile bicycle carrier;

FIG. 6 is a fragmentary view on an enlarged scale illustrating clamping of a portion of the bicycle frame to one of the arms on the bicycle support members;

FIG. 7 is a fragmentary perspective view illustrating a modified arrangement for mounting the rack on a vehicle.

FIG. 8 is a perspective view of a modified form of bicycle carrier mounted on the trunk deck of an automobile;

FIG. 9 is an end elevational view of the carrier of FIG. 8;

FIG. 10 is a side elevational view of the bicycle carrier of FIG. 8;

FIG. 11 is a top plan view of the bicycle carrier of FIG. 8;

FIG. 12 is a sectional view through one of the carrier mounting cups; and

FIG. 13 is a perspective view illustrating the carrier attaching strap.

Figure 2:
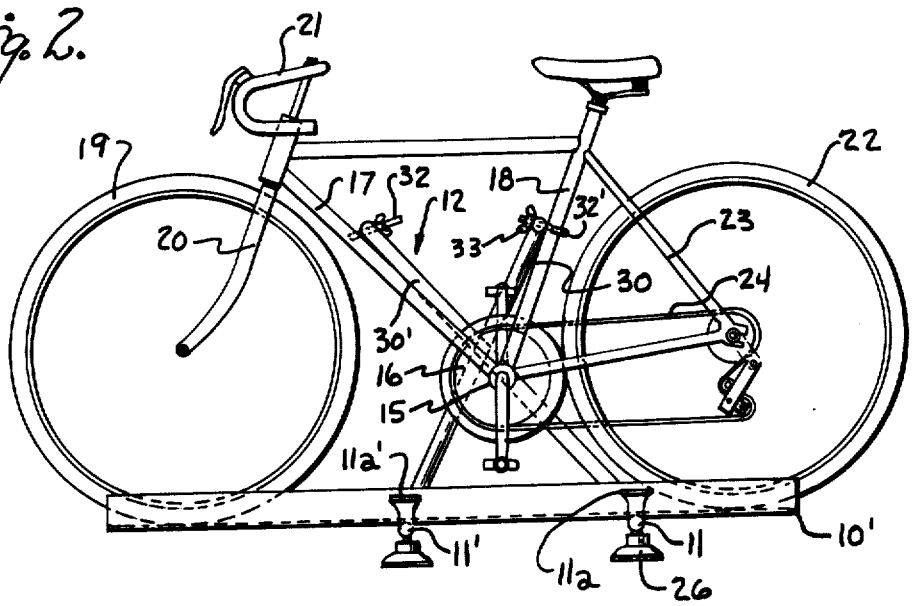
FIG. 2 is a side elevational view of the automobile bicycle shown mounted thereon.

The automobile bicycle carrier is adapted for mounting on either the trunk deck D or on the roof R of an automobile and, in general, includes a pair of elongated upwardly opening channels 10, 10' which are mounted in laterally spaced relatively parallel relation on cross-frame members 11, 11' and a bicycle support frame 12 mounted on the cross-frame members and extending upwardly between the channels for engaging a portion of the frame of a bicycle resting in each of the channels. A typical bicycle is shown in FIG. 2 mounted on the carrier and includes a hub 15 for rotatably supporting the crank 16, front and rear frame members 17 and 18 which extend upwardly from the hub 15, a front wheel 19 rotatably supported in a fork 20 controlled by handle bars 21 and a rear wheel 22 rotatably mounted on rearwardly extending frame members 23 and driven by a chain and sprocket arrangement 24. The channels 10, 10' are selected to have a length somewhat greater than the wheel base of the bicycle so as to receive the front and rear wheels 19 and 22 of the bicycles therein to not only support the bicycle but also inhibit turning of the front wheel about the fork axis.

The channels 10, 10' are detachably secured to the cross-frame members 11, 11' as by bolts 25 so that the channels can be removed from the cross-frame members for compact packaging. Any suitable means may be provided for mounting the rack on a vehicle and in the embodiment shown in FIGS. 1-5, suction cups 26 are attached to the cross-frame members, conveniently by the same bolts 25 used for connecting the channels to the cross-frame members, and straps 27 having hooks 28 are connected to the ends of the cross-frame members for engaging either the edge of the trunk deck or the drip bead on the vehicle roof. The cross-members 11, 11' are conveniently formed of tubular stock and the ends 11a, 11a' thereof are bent upwardly and flattened and formed with a strap receiving opening 11b, 11b' to space the straps 27 above the surface of the vehicle. In the embodiment of FIG. 7, the cross-frame members 11" are straight and have plates 11a" attached to their ends with strap receiving openings 11b" in the plates, and the cross-members are supported on blocks 26" of resilient material such as resilient foamed plastic, for example polyurethane. The blocks 26" have a key-hole shaped slot 26a" formed therein for receiving the end of the tubular cross-member 11". The straps 27 and hooks 28 hold the rack on the vehicle, as previously described, and the blocks 26" provide a resilient support for the rack and space the rack above the surface of the vehicle.

It is desirable to be able to open the trunk lid when the rack is mounted and, in order to provide clearance at the forward end of the rack, the channels are preferably attached to the cross-frame members so that the forward projection of the channels is less than the rear projection. Stated otherwise, the cross-members 11, 11' are attached to the channels at locations offset forwardly with respect to the longitudinal center of the channels.

The bicycle support frame includes first and second support members 30, 30' respectively attached at their lower ends to the front and rear cross-members 11, 11' and extending upwardly in relatively crossing relationship and having laterally extending bicycle engaging arms 30a and 30a' respectively at their upper ends for engaging a portion of the bicycle frame in a respective one of the channels 10, 10'. The members 30, 30' are disposed in a generally upright plane between the channels 10, 10' and are detachably interconnected at their crossover point as by a bolt 31 that extends through aligned openings in the support members to detachably interconnect the same. The arms 30a and 30a' at the upper ends of the support members are conveniently formed integrally with the support members as by bending the end portion of the support member laterally and, as best shown in FIG. 3, the arms 30a, 30a' extend laterally of the support members to a position overlying the respective channel 10, 10' and a clamp means, advantageously uniform of a J-bolt 32, 32', is mounted on the outer ends of each of the arms for clamping a portion of the bicycle frame to the arms. The stem of the J-bolt extends through transverse openings in the respective arms and the openings are preferably arranged so that the stem of the bolt extends generally perpendicular to the frame member on the bicycle to be engaged thereby. A wing nut 33 is provided on the stem of the J-bolt for tightening the same into clamping position and the hook portion of the J-bolt is preferably coated with a resilient material such as plastic or rubber to prevent scarring of the bicycle finish.

Figure 1:
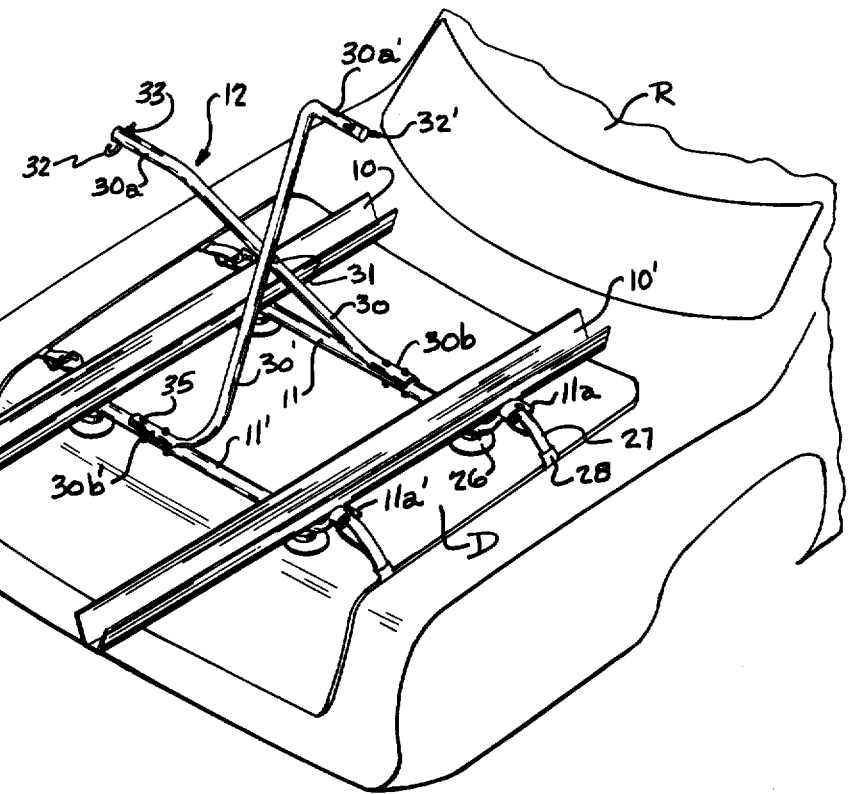
FIG. 1 is a perspective view of the automobile bicycle carrier shown mounted on the trunk deck of an automobile.

The lower ends of the support member 30, 30' are detachably but rigidly secured to the cross-frame members 11, 11' respectively. In the preferred embodiment illustrated, the lower ends of the support members 30, 30' are bent laterally to form foot portions 30b, 30b' respectively which are detachably secured as by bolts 35 to the cross-frame members. The foot portions 30b, 30b' preferably extend from the respective support member in a direction opposite the direction of the arm on that support member. As best shown in FIGS. 1 and 4, the underside of the foot portions 30b, 30b' are deformed inwardly to a longitudinally concave configuration to conform to the outer surface of the cross-frame members 11, 11'.

As previously described, the cross-frame members 11, 11' are attached to the longitudinal channels at locations that are offset forwardly with respect to the longitudinal center of the channels. The support members 30, 30', however, are preferably arranged so that the arms 30a, 30a' thereon are located generally symmetrically with respect to the longitudinal center of the channels. Stated otherwise, the arm 30a is offset forwardly from the longitudinal center line of the channels a distance substantially the same as the arm 30a' is offset rearwardly from the longitudinal center line of the channels. With this arrangement, the rear frame member 18 on one bicycle positioned in channel 10' can be clamped to the arm 30a', with the bicycle facing rearwardly with respect to the vehicle (to the left as shown in FIG. 2), and a second bicycle can be positioned in the other channel 10 facing forwardly (to the right as viewed in FIG. 2) with the rear frame member 18 on that bicycle clamped to the other arm 30a. For example, the channels can be made approximately 4 feet long and the arms 30a, 30a' offset respectively rearwardly and forwardly from the longitudinal center line of the channels approximately 6 inches and spaced above the base of the channels about 21½ inches. When arranged in this manner, the rear member 18 on a bicycle facing rearwardly in channel 10' can be clamped to the arm 30a' and a bicycle facing in the opposite direction in channel 10 can be clamped to the other arm 30a, and both bicycles will be approximately longitudinally centered in their respective channel. Alternatively, both bicycles can be arranged to face in the same direction with one arm clamped to the rear frame member 18 and the other arm clamped to the forward frame member 17.

The embodiment of FIGS. 8–12 is similar to that described in connection with FIGS. 1–6 and like numerals in the 100 series are used to designate corresponding parts. In this embodiment, the channels 110 and 110' are attached to the front and rear cross-frame members 111 and 111' by bolts 125. the bicycle support frame includes first and second elongated support members 130 and 130' formed of tubular stock and having their lower ends bent or curved laterally to form lateral mounting feet 130b and 130b' respectively. The upper ends of the elongated tubular members are also bent or curved laterally to form lateral bicycle mounting arms 130a and 130a' respectively. In this embodiment, the lateral foot member and the lateral bicycle mounting are on each of the elongated members extend in the same direction from the elongated support member to facilitate bending of both ends of the tubular member in a single operation. The foot members 130b and 130b' are respectively detachably secured to the front and rear cross-frame members 111 and 111' by bolts 135 and the elongated support members extend upwardly in relatively crossing relationship and generally parallel to an upright plane medially between the channels, and are detachably interconnected at the cross point by a bolt 131. As in the preceding embodiment, the lateral bicycle support arms 130a and 130a' respectively overlie the channels 110 and 110'. The longitudinal mid-point of the channels 110 and 110' is advantageously offset rearwardly from a point midway between the front and rear cross-frame members so that the channels project rearwardly from the rear cross-frame member a distance greater than they project forwardly from the front cross-frame member, as previously described. However, the lateral bicycle support arm 130a' on the member 130' and the lateral bicycle arm 130a on the member 130 are respectively spaced substantially equal distances from the forward end of the channel 110' and the rear end of the channel 110.

A modified mounting leg construction is shown in this embodiment and includes downwardly bent ends or legs 140 at the ends of each of the cross-frame members 111 and 111', and suction cups 126 having a socket in their upper side for receiving the downwardly bent legs. As best shown in FIG. 12, a washer 141 is preferably provided at the base of the socket at the top of the suction cup 126 to inhibit cutting of the suction cup by the lower end of the legs 140 and a clamp ring 142 is provided to extend around the socket on the suction cup and to be tightened by a clamp bolt 143 to firmly secure the suction cups to the lower end of the legs.

A modified form of strap and strap mounting best shown in FIG. 13 is also provided in this embodiment. In order to minimize the amount of strapping material required, the vehicle engaging hooks 128 are preferably attached to one end of the straps 127 and a strap engaging buckle 145 is attached to the carrier for detachable receiving the other end of the strap. As shown in FIG. 13, the hooks 128 are conveniently permanently attached to one end of the strap by extending one end of the strap through an opening in the hook and then securing the end of the strap back onto itself as by stitching or the like. The buckles 145 are of known construction and include spaced openings 145a so that the end of the strap can be inserted through one opening and the strap then bent back upon itself and extended through an adjacent opening to lock the strap in position. As shown in FIG. 8, the buckles 145 are located at opposite ends of the cross-frame members 111 and 111' and are conveniently attached by U-shaped clips 146 (FIG. 13) that have their ends interposed between the channels on the cross-frame members and secured thereto by the same bolts 125 that are used to secure the channels to the cross-frame members. Additional buckles 145 are also advantageously provided at the front and rear end, as shown, and attached by U-shaped clips 146 interposed between the mounting feet and the respective cross-frame member and secured thereto by the same bolts used to secure the mounting feet to the cross-frame members.

From the foregoing it is felt that the construction and use of the bicycle rack will be readily understood. When the relatively crossing bicycle support members are assembled on the cross-frame members, they provide a longitudinally and laterally rigid support for the bicycles resting in the channels. However, the support frame comprising the relatively crossing support members; the cross-frame members and channels can be disassembled for packaging and wing nuts can be used on all of the bolts to facilitate disassembly, if desired. When disassembled, the elongated support members can be positioned in a box with the arms and feet extending crosswise and the support members extending generally lengthwise therebetween so that the box only has to have a width sufficient to accommodate the length of the arms and a length sufficient to accommodate the length of the channels. This allows compact packaging of the rack in a box having a combined length and girth which is sufficiently small to allow shipping by most carriers and package handling services.

Several preferred embodiments of a bicycle carrier for two bicycles using one pair of channels with a pair of relatively crossing bicycle support members mounted on the cross-frame members between the pair of channels have been specifically illustrated and described. However, it will be seen that various modifications within the spirit of the invention will occur to those skilled in the art. For example, it is deemed apparent that a carrier for four bicycles can be readily made by using longer cross-frame members and mounting a second pair relatively crossing bicycle support members between the second pair of channels.

The embodiments of the invention in which an exclusive property or privilege is claimed are defined as follows:

1. In an automobile bicycle carrier for supporting at least two bicycles including first and second channels each adapted to receive the front and rear wheels of a bicycle, front and rear cross-frame members extending crosswise of the channels and detachably secured thereto to mount the channels in laterally spaced relatively parallel relation, means for mounting the cross-frame members on a vehicle, and support means attached to the cross-frame members intermediate said pair of channels and extending upwardly therefrom for engaging a portion of the frame of a bicycle in each of said channels, the improvement wherein said support means includes first and second elongated members each having an integral lower end portion curved to extend laterally therefrom and provide a lateral mounting foot and an integral upper end portion curved to extend laterally therefrom and provide a lateral bicycle mounting arm, means detachably securing the lateral mounting foot on the first elongated member to the front cross-frame member with said first elongated member extending upwardly and rearwardly from the front cross-frame member generally parallel to an upright plane intermediate the channels and with the lateral bicycle mounting arm thereon extending to one side of said upright plane into overlying relation to said first channel, means detachably securing the lateral mounting foot on the second elongated member to the rear cross-frame member with said second elongated member extending upwardly and forwardly from the rear cross-frame member generally parallel to said upright plane and with the lateral bicycle support arm thereon extending to the other side of said generally upright plane into overlying relation to said second channel, said first and second elongated members crossing each other at a location intermediate the upper and lower ends thereof and such that the lateral bicycle support arm on the first elongated member is spaced rearwardly a substantial distance from the lateral bicycle support arm on the second elongated member, means detachably interconnecting the first and second elongated members at the location of the crossing, and clamp means on each of the lateral bicycle support arms for detachably engaging a portion of the frame on a bicycle resting in the channel below the respective arm.

2. An automobile bicycle carrier according to claim 1 wherein said clamp means on the bicycle support arms each comprise a J-bolt having the stem thereof extending through a transverse opening in the respective arm and a nut on the stem of the J-bolt to adjust the same and clamp a portion of the bicycle frame to the arm.

3. An automobile bicycle carrier according to claim 1 wherein the lateral mounting foot and the lateral bicycle support arm on each elongated member extend to relatively opposite sides of said upright plane.

4. An automobile bicycle carrier according to claim 1 wherein the lateral mounting foot and the lateral bicycle support arm on each elongated member extend to the same side of said upright plane.

5. An automobile bicycle carrier according to claim 1 wherein the longitudinal mid-point of the first and second channels is offset rearwardly from a point mid-way between the front and rear cross-frame members such that the first and second channels project rearwardly from the rear cross-frame member a distance greater than they project forwardly from the front cross-frame members, the lateral bicycle support arm on the first elongated member and the lateral bicycle support arm on the second elongated member respectively being spaced substantially equal distances from the rear end of the first channel and the forward end of the second channel.

6. An automobile bicycle carrier according to claim 5 wherein said clamp means on the bicycle support arms each comprise a J-bolt having the stem thereof extending through a transverse opening in the respective arm and a nut on the stem of the J-bolt to adjust the same and clamp a portion of the bicycle frame to the arm.

* * * * *